US009676667B2

(12) United States Patent
Kalliola et al.

(10) Patent No.: US 9,676,667 B2
(45) Date of Patent: Jun. 13, 2017

(54) USE OF OXIDIZED LIGNIN AS A DISPERSANT

(71) Applicant: Teknologian tutkimuskeskus VTT Oy, Espoo (FI)

(72) Inventors: Anna Kalliola, Espoo (FI); Tiina Liitiä, Espoo (FI); Tarja Tamminen, Espoo (FI); Tapio Vehmas, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 15/026,618

(22) PCT Filed: Oct. 2, 2014

(86) PCT No.: PCT/FI2014/050754
§ 371 (c)(1),
(2) Date: Apr. 1, 2016

(87) PCT Pub. No.: WO2015/049424
PCT Pub. Date: Apr. 9, 2015

(65) Prior Publication Data
US 2016/0244364 A1   Aug. 25, 2016

(30) Foreign Application Priority Data

Oct. 2, 2013   (FI) .................................... 20135986

(51) Int. Cl.
*C04B 16/00* (2006.01)
*C04B 24/24* (2006.01)
(Continued)

(52) U.S. Cl.
CPC ............ *C04B 24/24* (2013.01); *C04B 20/023* (2013.01); *C04B 28/04* (2013.01); *C04B 2103/30* (2013.01); *Y02W 30/97* (2015.05)

(58) Field of Classification Search
CPC ...................................................... C04B 16/00
See application file for complete search history.

(56) References Cited

U.S. PATENT DOCUMENTS 3,726,850 A * 4/1973 Detroit ..................... C08H 6/00
106/823
3,910,873 A * 10/1975 Lin .......................... C08H 6/00
516/47
(Continued)

FOREIGN PATENT DOCUMENTS

CN      1654407 A1    8/2005
CN    101885823 A    11/2010
(Continued)

OTHER PUBLICATIONS

Ouyang X. et al: Oxidative degradation of soda liginin assisted by microwave irradiation. Chinese Journal of Chemical Engineering. vol. 18, 2010.

*Primary Examiner* — Paul Marcantoni
(74) *Attorney, Agent, or Firm* — Seppo Laine Oy (57) ABSTRACT

The present invention concerns a process for oxidizing lignin at alkaline conditions. This oxidized lignin can be used as a dispersant in various end-products, for example as a renewable plasticizer in cement-containing products, such as concrete, where the ability of the oxidized lignin to endure alkaline conditions is an advantage. Further, the invention concerns a concrete mixture containing aggregate, cement, water and a plasticizer formed of oxidized lignin, and a process for producing such a concrete mixture. The oxidized lignin can be manufactured using a process, where the lignin starting material is reacted with an oxidizing agent in solution in alkaline conditions.

16 Claims, 6 Drawing Sheets (51) Int. Cl.
  *C04B 28/04*  (2006.01)
  *C04B 20/02*  (2006.01)
  *C04B 103/30*  (2006.01)

(56) References Cited

U.S. PATENT DOCUMENTS

| | | | |
|---|---|---|---|
| 4,611,659 A | | 9/1986 | DeBons et al. |
| 5,416,552 A | * | 5/1995 | Fakler ............ G03D 3/065 396/604 |
| 5,811,527 A | * | 9/1998 | Ishitoku ............ B01F 17/0078 106/657 |
| 6,238,475 B1 | * | 5/2001 | Gargulak ............ C04B 24/18 106/725 |

FOREIGN PATENT DOCUMENTS

| | | |
|---|---|---|
| CN | 102241818 A | 11/2011 |
| KR | 20100002916 A | 1/2010 |
| WO | WO0136344 A2 | 5/2001 |

* cited by examiner

Fig. 11 a, b and c

USE OF OXIDIZED LIGNIN AS A DISPERSANT

BACKGROUND OF THE INVENTION

Field of the Invention

The present invention concerns a process for oxidizing lignin at alkaline conditions. This oxidized lignin can be used as a dispersant in various end-products, for example as a renewable plasticizer in cement-containing products, such as concrete, where the ability of the oxidized lignin to endure alkaline conditions is an advantage.

Description of Related Art

Concrete is one of the most commonly used industrially manufactured materials in the world, and manners of improving its strength and durability are constantly under research. Aggregate and cement are the main components of concrete, but also water is required, and usually, various additives are used, for example to improve the fresh-stage or hardening properties of the final product.

Water plays a dual role in concrete production; it provides the concrete mixture with certain rheological properties, and it participates in the essential hydration reaction, and is required to bring the cement into a paste-like form. However, concrete is particularly strong when it contains only low amounts of water. Thus, a lower water-to-concrete ratio yields a stronger, more durable concrete, while a higher ratio gives a freely-flowing cement-mixture with a higher slump.

To obtain both a strong concrete product and advantageous cement flow-properties, plasticizers (or dispersants) are often added into the concrete mixture to improve the workability, i.e. to decrease the yield stress (or shearing resistance), of the concrete mixture, while using low water contents.

Petroleum-based polyelectrolytes, known as superplasticizers, have typically been considered to be the most efficient plasticizers. However, there exists a constant need to replace petroleum-based products with renewable alternatives.

Superplasticizers act by adsorbing to the cement particle surface and cause electrostatic and steric repulsions between individual cement particles to achieve full dispersion. The active functional groups of the superplasticizers, i.e. the sulfonic (—$SO_3H$) and the carboxylic (—COOH) groups, are responsible for achieving the electrostatic repulsion by interacting with the active sites on the cement particles, while the branched structure of the polyelectrolyte achieves steric repulsion by forcing the cement particles apart.

Water-soluble lignosulfonates, which are by-products of sulfite pulping, are also used due to their highly branched and sulfonic charged structure, but their effect is limited.

At the present, the main source of lignin is the alkaline sulfate (i.e. kraft) process. The soda process, on the other hand, is the predominant process used for chemical pulping of non-wood materials. Also $2^{nd}$ generation bioethanol production from lignicellulosics provides a source of lignin.

Presently only a fraction of the lignin formed during the pulping is separated from the spent pulping liquors and employed in specialty products. Instead, the remaining liquors (and lignin) serve, for example, as biofuel in pulp mills. Thus, there is a clear need for further lignin exploitation methods.

Kraft or soda lignins (among other potential lignins) would be both cost-effective and environmental alternatives to petroleum-based or lignosulfonate-based plasticizers in concrete mixtures. In unmodified form they, however, lack the sufficient efficiency required for their use as plasticizers or dispersants.

Modification of lignin has been attempted in the past, such as by sulfonating the lignin (as in CN102241818A, CN101885823A and U.S. Pat. No. 5,811,527A), or by adding amine or ammonium groups to lignosulfonates (as in U.S. Pat. No. 6,238,475B1 and WO2001036344A2). Such modifying processes generally include also an oxidizing step, but this step is not carried out under effective conditions, since it is merely intended to provide a suitable basis for further modifications.

This known oxidation of lignin has been described in, for example, U.S. Pat. No. 3,910,873A, but this process was not developed for the requirements of the concrete industry, and can still be improved. Further processes for the oxidation of lignin are described in U.S. Pat. No. 4,611,659A and U.S. Pat. No. 3,726,850A,

SUMMARY OF THE INVENTION

It is an object of the present invention to provide renewable plasticizers for the concrete industry.

It is a further object of the invention to provide a novel process for oxidizing lignins in alkaline conditions.

Particularly, it is an object of the present invention to provide a process for oxidizing lignins to render these lignins suitable for use as plasticizers in concrete.

These and other objects, together with the advantages thereof over known materials and processes, are achieved by the present invention, as hereinafter described and claimed.

The invention is based on the finding that oxygen oxidation in alkaline conditions can be used as means to increase the hydrophilic properties of lignin for dispersing applications. Oxidized lignins have shown good dispersing properties especially in reducing the shear stress of cement slurry. Thereby, oxidized lignin is a suitable renewable alternative to replace petroleum-based plasticizers (water reducing agents) in concrete technology.

Thus, the present invention concerns a process for oxidizing lignin, where the lignin starting material is reacted with an oxidizing agent in solution. The oxidation of the lignin under alkali conditions causes minor degradation of lignin and increases its carboxyl content (i.e. the content of carboxyl groups in lignin macromolecule or as separate small molecular weight acids), thus rendering it more hydrophilic. The invention also concerns the use of this oxidized lignin in cement-containing products, such as concrete.

More specifically, the process of the present invention is characterized by what is stated in the characterizing part of claim 1.

Further, the use of the present invention is characterized by what is stated in claim 8 and the concrete mixture of the present invention is characterized by what is stated in claim 11.

Considerable advantages are obtained by means of the invention. Thus, the present invention provides a new type of plasticizer (or cement dispersant) that is based on entirely renewable raw materials, i.e. lignins.

The plasticizing effect of this plasticizer, obtained by the plasticizer reducing the shear stress of e.g. a cement slurry, is far better than the effect of unmodified lignin. Also the yield stress of the cement slurry produced using such a plasticizer (or dispersant) is decreased significantly compared to cement slurries produced using commercial lignosulfonates.

Further, the oxidized lignin of the invention is inexpensive compared to synthetic alternatives, such as the commonly used polycarboxylate ether-based superplasticizers.

Next, the invention will be described more closely with reference to the attached drawings and a detailed description.

BRIEF DESCRIPTION OF THE DRAWINGS

FIGS. 11 A, B, and C FIG. 11 A. illustrates the slump test results of fresh state concrete plasticized using the plasticizer of the invention (Soda wheat 15% 2 ox, Soda wheat constant pH ox, Soda wheat 2 ox constant pH—without or with the defoamer agent TBF), unmodified lignin (Soda wheat), Glenium 51 or WRDA 90D. FIG. 11 B. illustrates the air content in the fresh state concrete. The labels in FIG. 11 B are the same as in FIG. 11 A. FIG. 11 C. illustrates the correlation of the air content in fresh concrete and the density and compression strength of the matured concrete (28 d). Cross for Density, Diamond for Compression strength.

DETAILED DESCRIPTION OF EMBODIMENTS OF THE INVENTION

The present invention concerns a concrete mixture containing aggregate, cement, water and a plasticizer formed of oxidized lignin.

The term "plasticizer" is intended to cover also "dispersants", depending on their end-use. Thus, the oxidized lignin functioning as a plasticizer in the concrete mixture of the invention can be used as a dispersant in other end-products.

In the context of the present invention, the plasticizer (as lignin dry solids bases) is preferably used in a content of ≤0.63 w-% of the cement dry solids. In the concrete mixture, this corresponds to ≤2.7 kg/m$^3$ of concrete mixture.

The used cement is generally selected from inorganic binders, such as Portland cements, Pozzolanic cements, Belite cements, Belite-calcium sulphoaluminate-ferrite cements, calcium aluminate cements, aluminate cements, aluminate silicate cements, sulphate aluminate cements, calcium aluminoferrite cements, calcium sulphate cements, calcium sulphoaluminate cements, sulphoaluminate cements, supersulphate cements, lime-pozzolanic cements, magnesium cements, magnesium oxy-chloride cements, magnesium oxy-carbonate cements, magnesium phosphate cements, magnesium sulphate cements, calcium phosphate cements, phosphate cements, lime-sulphate activated cements, calcium carbonate cements, gypsum, calcium sulphate hemihydrate, calcium sulphate anhydrite, geopolymeric cements, hydraulic lime cements, or binary, ternary or quaternary blends of any of these. A particularly useful type of cement is the Portland cements.

In preparing concrete mixture, the cement is most conveniently used as 200-500 kg/m$^3$ dosage with water/cement—ratio 0.30-0.75.

The used aggregate typically consists of conventional stone aggregate, suitable for concrete applications.

The oxidized lignin, in turn, is preferably obtained by oxidizing a lignin-containing material, which has been obtained from a lignocellulose biomass, such as a wood-based or other plant-based source, one example being pulping liquors, or lignin side-streams originating from bioethanol production.

The invention also concerns a process for manufacturing such a concrete mixture by mixing the aggregate, the cement, the water and the plasticizer formed of oxidized lignin.

The plasticizer can be added at any point of the mixing process. Most preferably, plasticizer will be added at last.

Further, the present invention concerns a process for manufacturing oxidized lignin, where the lignin starting material is reacted with an oxidizing agent in solution. The reaction is, according to the present invention, carried out in alkaline conditions, i.e. at a pH within the range 8-14, typically using a load of oxidizing agent of 10-95 w-%, preferably 10-50 w-%, calculated based on the weight of the lignin.

Preferably, the pH of the lignin solution is adjusted to a value of 10-14 prior to addition of the oxidizing agent.

Optionally, the pH of the lignin solution may be kept constant, in a range of 11-13 during the oxidation.

Maintaining a desired pH level can be done, for example, with the help of an addition of alkaline agent, such as sodium hydroxide (NaOH) or sodium carbonate ($Na_2CO_3$), or both, preferably in a content of 20-50 w-% of the lignin, most suitably in a content of 23-45 w-%, or using buffering. Typically, the alkaline agent is added to the lignin solution before adding the oxidizing agent. Some excess alkaline agent can also be added later, during the oxidation reaction, in order to further adjust the pH to a higher level. The amount of alkaline agent required for this adjustment is, however, dependent on various properties of the lignin solution (e.g. its initial pH, its current pH, its lignin content and its content of further substances).

Generally, the first step of the process is, however, forming an aqueous alkali lignin solution (or slurry). The starting material is, thus, a lignin-containing material or pure lignin.

In order to produce the lignin-based plasticizer of the invention, the lignin dry solids of the product solution (the oxidized lignin) is selected to be high enough to ensure feasible use of the product. Increase in lignin dry solids in the oxidation causes condensation (in addition to lignin degradation) resulting in an increase in the molar mass of the oxidized lignin. Also, the polydispersity of the lignin increases, which may provide further benefits for the plasticizing purposes. Yet, the negative charge and the molar mass of the lignin based plasticizer product can be controlled by the oxidation parameters.

Thus, the aqueous lignin solution formed in the first step of the process preferably has a lignin content of 0.5-30 w-%, more preferably 5-25 w-%, and most suitably 15-25 w-%.

According to an embodiment of the invention, the oxidation is carried out on non-purified lignin-containing slurries. Slurries with high lignin contents include, among others, pulping liquors (e.g. black liquor), but it is preferred to separate the lignin fraction from such pulping liquors before oxidizing. The obtained separate lignin fraction does not require further purification (i.e. small amounts of impurities can be allowed), although an optional concentrating step can be carried out if black liquor is used.

In a subsequent step of the process, an alkaline agent can be added to the aqueous lignin solution, prior to addition of the oxidizing agent, to provide the desired alkaline conditions. Optionally, buffering can be used.

The oxidizing agent used in the process is preferably selected from oxygen ($O_2$) or oxygen-containing gas mixtures, such as air, ozone ($O_3$) and hydrogen peroxide ($H_2O_2$), most suitably from oxygen ($O_2$). Oxygen is an inexpensive and environmentally friendly chemical and highly suitable for modifying lignin.

When both an oxidizing agent and an alkali are used in the oxidation process according to the invention, the contents of either of these can be varied to further cause changes in the final oxidized lignin.

The oxidizing agent can be allowed to react with the lignin for a prolonged period of time, such as for 3-120 minutes, preferably 3-60 minutes, and most suitably for 5-30 minutes.

A further advantage is obtained by adjusting the initial temperature to a level of ≤100° C. for the oxidation reaction, preferably 25-80° C., more preferably 40-80° C., and most suitably 60-80° C.

Generally, the following ranges have been found particularly suitable for use in the oxidation of the present invention:

| | |
|---|---|
| Lignin concentration in solution, w-% | 0.75-25.0 |
| Alkali concentration, w-% of lignin | 23-45 |
| $O_2$ load, w-% of lignin | 12-50 |
| $O_2$ consumption, w-% of lignin | 8-11 |
| Reaction T (initial), ° C. | ≤100 |
| Reaction t, min | 3-30 |

By controlling the parameters in the oxidation (e.g. lignin dry solids, initial $O_2$ dose, reaction time and initial temperature), the properties of the product can be controlled (e.g. charge, mmol/g, and molar mass, g/mol).

The oxidized lignin obtained in this manner is particularly suitable for use as a plasticizer in cement and cement-containing products, such as concrete.

The oxidation reaction results in the formation of charged groups in lignin, mainly due to the degradation of the phenolic groups. The formed charged groups can be in the form of carboxylic acid groups, or lactone structures that are formed during the oxidation and hydrolysed to acidic structures under highly alkali conditions, such as the conditions prevailing in cement and concrete. The charged groups can form a part of the lignin macromolecule, or they can be in the form of separate acids. The change in the chemical structure and the composition of the lignin leads to an increase in its hydrophilic properties, which is particularly advantageous for dispersing and plasticizing applications.

Alkaline oxidation is also a means to produce soluble lignin with a relatively high molar mass. Such a lignin product is particularly useful in plasticizing inorganic binders in construction materials, e.g. mortar and concrete.

The oxidized lignin is preferably used in the manufacture of paste mortar or concrete as such, i.e. as a slurry, without a separate isolation and drying step. If required for an alternative end-use, the oxidized lignin product can, however, be separated and dried.

Thus, the oxidized lignin of the invention is suitable for use in also alternative applications, not only as a plasticizer, but as any type of dispersant. It can be generalized that the most suitable applications are processes where an alkaline pH is used (or possibly neutral). In such environments, it can be ensured that the lignin material is completely dissolved. Said processes where an alkaline pH is used, include the preferred process for the production of cement, and processes for the further use of the cement in producing, for example concrete or mortar.

In one embodiment of the invention the oxidized lignin is manufactured in an at least 2-stage oxidation process in which lignin condensation is induced during a first oxidation and negative charge of the lignin is increased during an at least second oxidation. Up to 10 sequential oxidations may be carried out. The oxidations may be carried out in a cascade or in parallel In a further embodiment the pH in the lignin solution is maintained constant using a reaction calorimetry reactor, said reactor being equipped with a pH control loop and a pump to introduce an alkaline agent to the reaction solution under excess oxidizing agent, preferably under excess oxygen.

The plasticizers of the invention produced by 2-stage oxidation (two sequential oxidations), constant pH oxidation, and combination of the aforementioned, are superior to lignosulphonate products and offer fairly good plasticizing performance in comparison to the petroleum-based superplasticizers. Characteristics and the performance of the oxidized lignin can be manipulated by the oxidation parameters, especially by the pH profile in pH rage 10-14, and by conducting the oxidations in sequence. For example, the constant pH oxidation (at pH 11.5) in the case of commercial soda wheat straw lignin (Protobind 1000) provides an excellent plasticizer that does not cause extra air entrance in concrete. This ensures properties in matured concrete (density and compression strength) that are comparable with the cases wherein commercial plasticizers have been used.

The following non-limiting examples are intended merely to illustrate the advantages obtained with the embodiments of the present invention.

EXAMPLES

Example 1—Oxidation

Commercial soda wheat straw lignin (Protobind 1000), a by-product of alkaline pulping process, produced by Green Value was oxidized using pure $O_2$ at varying lignin dry solids contents (0.75, 5, 15, and 25 w-%) under alkaline conditions at elevated temperatures. The NaOH dosage used was 23-45 w-% of lignin dry solids (initial pH~13). The oxidation was conducted in a 1 L Parr reactor with initial $O_2$ dose 12-32 w-% of lignin dry solids. A given initial $O_2$ dose can be set by varying the volume ratio of reactor head space vs. lignin solution combined with varying the initial $O_2$ excess (from 5 to 40 bars). The temperature in the oxidation experiments conducted using 5, 15, and 25 w-% lignin dry solids was 50-80° C. The $O_2$ uptake during the reaction period (6 or 30 minutes) was 8-11 w-% of lignin dry solids.

In general, increasing the temperature increased also the $O_2$ uptake, resulting in an increase of carboxylic acid groups (COOH) and in a decrease in phenolic structures. Yet, lignin oxidation took place already at room temperature (RT).

The samples used in the following tests and subsequent examples included the following:

| | |
|---|---|
| Soda wheat = | unmodified lignin (Protobind 1000), dissolved in 0.1M NaOH at 0.75 w-% dry solids (Soda wheat 0.75%) or dissolved in 1M NaOH at 15 w-% dry solids (Soda wheat 15%) |
| Soda wheat 0.75% oxidized = | Soda wheat diss. in 0.1M NaOH at 0.75 w-% dry solids, init. $O_2$ dose 23 w-% |
| Soda wheat 5% oxidized = | Soda wheat dissolved in 0.5M NaOH at 5 w-% dry solids, init. $O_2$ dose 12 w-% |
| Soda wheat 15% oxidized = | Soda wheat dissolved in 1M NaOH at 15 w-% dry solids, init. $O_2$ dose 16 w-% |
| Soda wheat 25% oxidized = | Soda wheat dissolved in 2.5M NaOH at 25 w-% dry solids, init. $O_2$ dose 32 w-% |
| WRDA 90D = | commercial lignosulphonate based plasticizer |
| Glenium C151 = | commercial synthetic plasticizer |

Example 2—Analyzing the Lignin Fractions

The analyzed samples included the lignin samples described in the following Table 1. Said table also includes some measured characteristics of the samples.

TABLE 1

Samples used in the following Examples

| Sample name | Plasticizer dry solids in solution, w-% | Initial $O_2$/lignin, w-% | Consumed $O_2$/lignin, w-% | Mn | Mw | PD | Small acids* of initial lignin, w-% | Amount of negative charged groups at pH 6, mmol/g |
|---|---|---|---|---|---|---|---|---|
| Soda wheat 15% | 15 | — | — | 2100 | 3400 | 1.6 | 1.6 | 1.7 |
| Soda wheat 0.75% oxidized | 0.75 | 23 | 11 | 1705 | 2783 | 1.6 | 5.7 | 3.7 |
| Soda wheat 5% oxidized | 5 | 12 | 10 | 2300 | 4200 | 1.8 | 6.0 | 4.5 |
| Soda wheat 15% oxidized | 15 | 16 | 8 | 3000 | 6400 | 2.1 | 3.8 | 3.2 |
| Soda wheat 25% oxidized | 25 | 32 | 11 | 3100 | 7000 | 2.3 | n.d | 3.8 |

TABLE 1-continued

Samples used in the following Examples

| Sample name | Plasticizer dry solids in solution, w-% | Initial O$_2$/lignin, w-% | Consumed O$_2$/lignin, w-% | Mn | Mw | PD | Small acids* of initial lignin, w-% | Amount of negative charged groups at pH 6, mmol/g |
|---|---|---|---|---|---|---|---|---|
| WRDA 90D | 30 | — | — | 1700 | 3000 | 1.8 | 9.8 | n.d |
| Glenium C151 | 15 | — | — | 5100 | 15900 | 3.1 | n.d | n.d |

Mn = number average molecular weight
Mw = molecular weight
PD = polydispersivity
n.d = not determined
*Separate small molecular weight carboxylic acids (≤C6), degradation products of lignin, detected by capillary electroforesis analysis according to Rovio et al. (Rovio, S., Kuitunen, S., Ohra-aho, T., Alakurtti, S., Kalliola, A., Tamminen, T., *Holzforschung* 65, 575-585, 2011)

The samples included unmodified lignin, oxidized lignin and commercial plasticizers. Average molecular weight classes (Mn, Mw) of these oxidized and unmodified lignin samples as well as the commercial plasticizers were measured by size exclusion chromatography (SEC), using PSS MCX 1000 and 100 000 columns in 0.1 M NaOH eluent (25° C.) with UV (280 nm) and RI detection. The molecular weight distributions and average molecular weights were calculated in relation to polystyrene sulfonate standards, using Waters Empower 2 software. The results are shown in Table 1 above.

Figure 1:
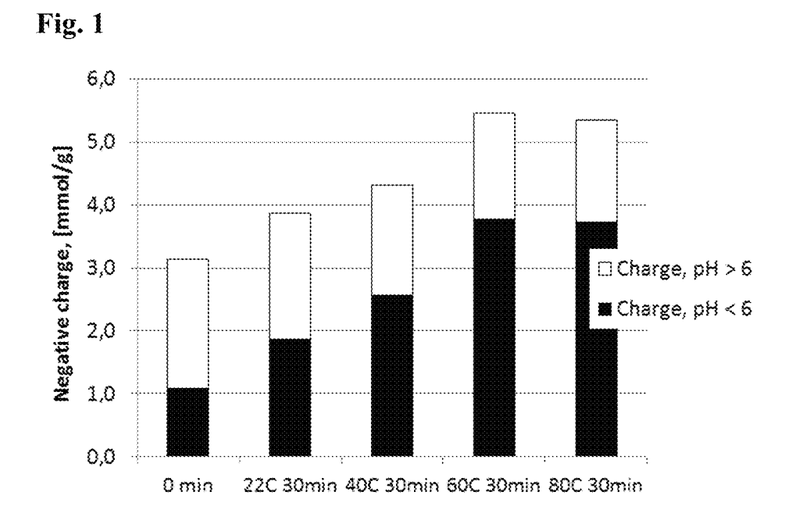
FIG. 1 shows the charge of soda wheat lignin samples according to the invention, oxidized at a consistency of 0.75%, using different temperatures (22, 40, 60 and 80° C.) and a constant reaction time (30 min). Unmodified lignin (Soda wheat 0.75%) (0 min) was used as a reference.
Figure 2:
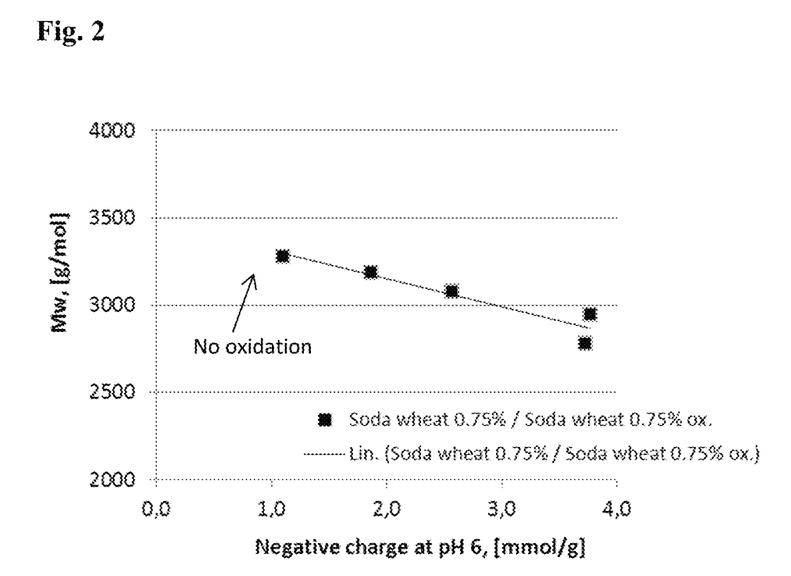
FIG. 2 shows the molecular weight vs. charge of lignin oxidized according to the present invention, using oxidation temperatures of 22, 40, 60 and 80° C. Unmodified lignin (Soda wheat 0.75%)(No oxidation) was used as a reference.
Figure 3:
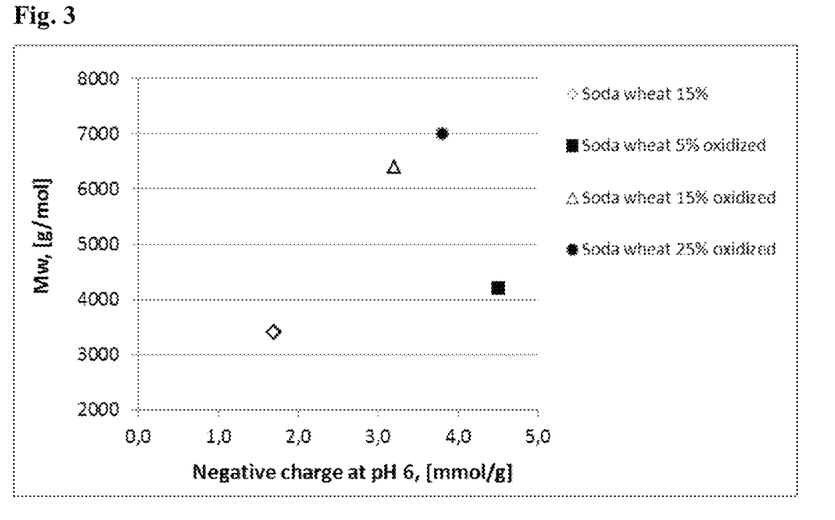
FIG. 3 shows the molecular weight vs. charge of the plasticizer of the invention (Soda wheat 5% oxidized, Soda wheat 15% oxidized and Soda wheat 25% oxidized), using unmodified lignin (Soda wheat 15%) as a reference.

The charge of the samples was determined by potentiometric titration from solution. The potentiometric titration of lignin charge was conducted according to Rahikainen et al. (Rahikainen, J. L., Evans, J. D., Mikander, S., Kalliola, A., Puranen, T., Tamminen, T., Marjamaaa, K., Kruus, K., *Enzyme and Microbial Technology*, 53 (5) 315-321, 2013) with the exception that the sample titrated was oxidised (or unmodified) lignin solution instead of isolated, dry lignin. The molar amount of NaOH for the blank titration was set according to that initially existing in the lignin sample solution. The results are shown in FIGS. 1, 2 and 3. For FIG. 1 the results are indicating the effect of the oxidation temperature, whereas FIGS. 2 and 3 provide the molar mass vs. charge.

From the results it becomes clear, among others, that increase in lignin dry solids in the oxidation causes condensation (in addition to lignin degradation), resulting in increase in molecular weight of the oxidized lignin.

Negative charge at pH 6 in oxidized lignin solution is twice as high as that of unmodified lignin. The charge originates mostly from lignin bound carboxylic acids groups as well as from separate small molecular weight acids. The content of the small molecular weight acids contributing to the charge of the oxidized lignin may be up to 10 w-% of the lignin material.

Example 3—Analyzing Cement Samples Containing Oxidized Lignin

Figure 4:
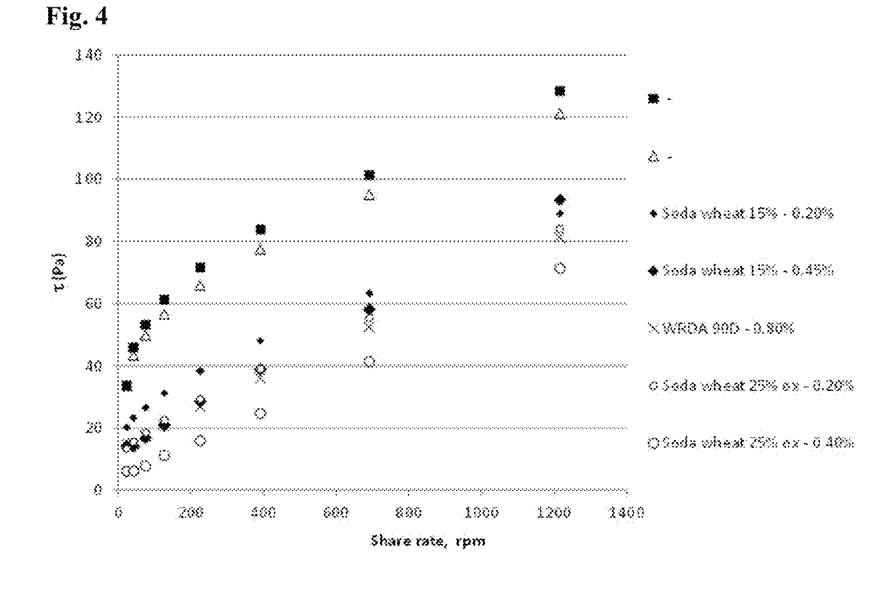
FIG. 4 shows the shear stress vs. shear rate of 70 w-% of a cement (CEM I), containing different amounts of the plasticizer of the invention (Soda wheat 25% oxidized), using unmodified lignin (Soda wheat 15%) and WRDA 90D as reference plasticizers, or no plasticizer (−).
Figure 5:
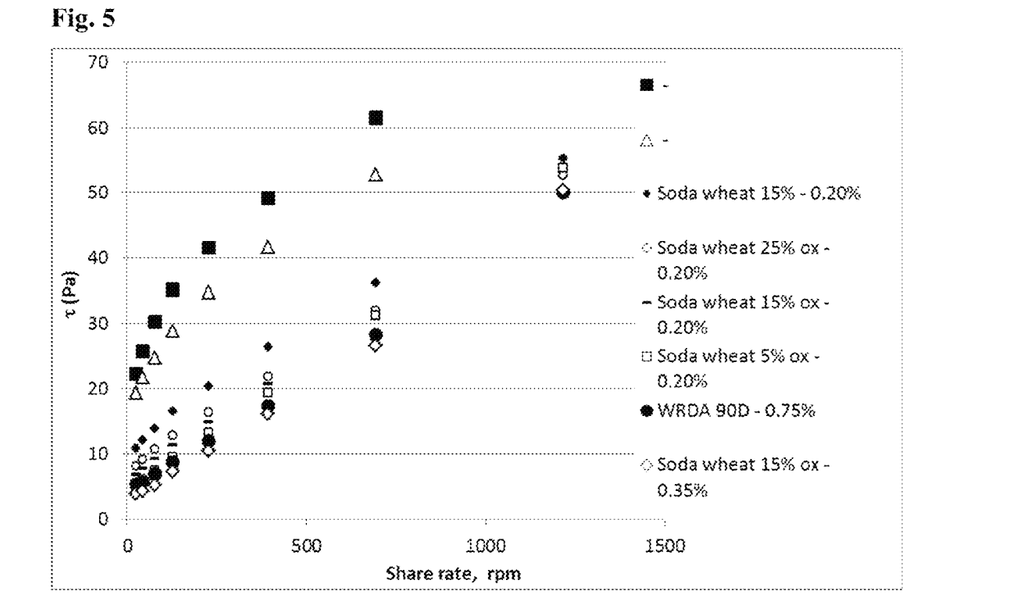
FIG. 5 shows the shear stress vs. shear rate of 66 w-% of a cement (CEM II), containing different amounts of the plasticizer of the invention (Soda wheat 5% oxidized, Soda wheat 15% oxidized and Soda wheat 25% oxidized), unmodified lignin (Soda wheat 15%) and WRDA 90D as reference plasticizers or no plasticizer (−).

The lignin oxidized as above (Soda wheat 5% oxidized, Soda wheat 15% oxidized, Soda wheat 25% oxidized) was tested for the plasticizing performance using the cement types CEM I (Megasementti CEM I 42,5 R, provided by FinnSementti) and CEM II (Plussasementti CEM II B-M (S-LL) 42,5 N, provided by FinnSementti) as the test medium. The shear stress of the test medium with or without plasticizer was measured as a function of shear rate using a viscometer, Bohlin Visco 88. A commercial lignosulphonate product—WRDA 90D (containing 30 w-% of lignosulphonate) was used as reference. Unmodified lignin dissolved in 1 NaOH at 15 w-% dry solids was used as reference as well. Cement-water (dry solids: 70 w-% for CEM I, and 66 w-% for CEM II) dispersions were prepared with and without plasticizer solution using efficient mixing, Heidolph DIAX 600. The plasticizer was mixed into a pre-dispersed cement-water mixture. Several plasticizer dosages (as plasticizer dry solids bases), in a range of 0.20-0.80 w-% of the cement dry solids, were tested. The shear stress as a function of share rate was measured immediately after preparing the sample. The results are shown in FIG. 4 (for CEM I) and in FIG. 5 (for CEM II).

CEMI and CEM II are both grades of Portland cement that are commonly used in concrete applications.

CEM I has a chemical composition of: CaO 60-61%, SiO$_2$ 18-19%, Al$_2$O$_3$, Fe$_2$O$_3$, MgO CEM II has a chemical composition of: CaO 63-65%, SiO$_2$ 20-22%, Al$_2$O$_3$, Fe$_2$O$_3$, MgO From FIGS. 4 and 5 it can be seen that oxidation improves the function of the lignin as a plasticizer, i.e. decreases yield stress as well as shear stress of the cement-water mixtures as a function of shear rate.

The lower the shear stress with a given shear rate the better the plasticizing performance of the added product. Additives typically slow down the hydration of the cement, i.e. its reaction with water, whereby low doses of plasticizer are desirable.

Also unmodified lignin functions as a plasticizer, but requires a larger dose to achieve the same yield stress, compared to oxidized lignin. Lignosulfonates require even higher doses.

Figure 6:
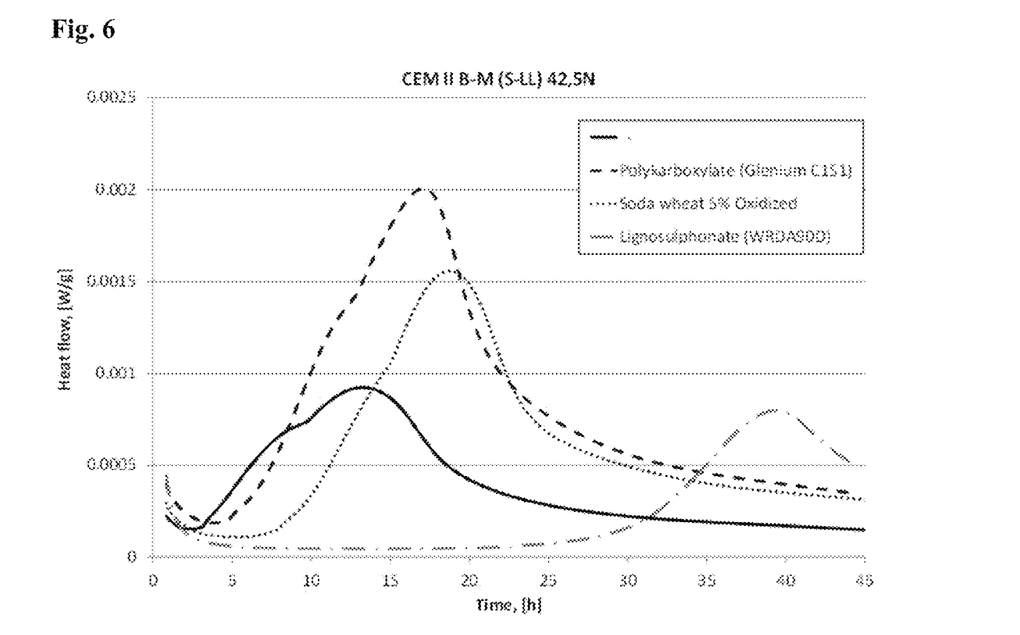
FIG. 6 illustrates the reaction heat of cement (CEM II) containing the plasticizer of the invention (Soda wheat 5% oxidized), Glenium C151 and WRDA 90D as reference plasticizers or no plasticizer (−).

One of the above cement samples, CEM II, with or without plasticizer, was also tested for its reaction heat, caused by the hydration reaction (which will take place also in concrete mixtures). The heat flow was measured as a function of time using a calorimetric method. The plasticizer according to the invention was Soda wheat 5% oxidized. The dosing of the plasticizer was adjusted to give a cement yield stress of about 10 Pa. One reference sample was prepared without plasticizer (−). Used reference plasticizers were: Glenium C151 (a commercial synthetic plasticizer) and WRDA 90D (a commercial lignosulphonate plasticizer). The results are shown in FIG. 6.

The effect of the oxidized lignin on the hydration reaction of cement was superior to WRDA 90D i.e. oxidized lignin hindered the reaction less than WRDA 90D.

Example 4—Measuring the Slump of Oxidized Lignin-Plasticized Concrete

The plasticizing performance of the oxidized lignins was verified by using concrete (cement+stone aggregate+water) as a test medium.

The slump was determined for the unmodified lignin and oxidized lignin-plasticized concrete. WRDA 90D was used as a reference plasticizer. Concrete was prepared according to EN1766 type C(0,40), with the exception that CEMII B-M (S-LL) 42,5N was used as the cement. The oxidized lignin plasticizer was soda wheat lignin, oxidized at various lignin dry solids (5%, 15% and 25%). The reference sample contained unmodified soda wheat lignin (at dry solids of 15%). The contents of these lignins were 2.69 kg/m$^3$. One sample was also prepared with Soda wheat 15% oxidized, using a dose of 1.35 kg/m$^3$. WRDA 90D reference plasticizer dose was 5.06 kg/m$^3$.

Figure 7:
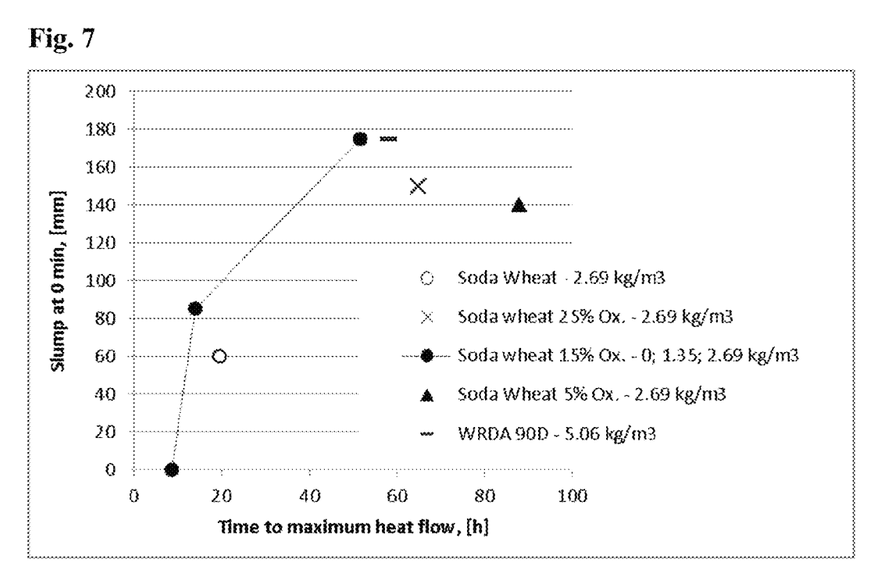
FIG. 7 illustrates the slump test results of lignin plasticized concrete at 0 min vs. time to maximum heat flow, the samples containing either the plasticizer of the invention (Soda wheat 5% oxidized, Soda wheat 15% oxidized and Soda wheat 25% oxidized), unmodified lignin (Soda wheat 15%) or WRDA 90D.
Figure 8:
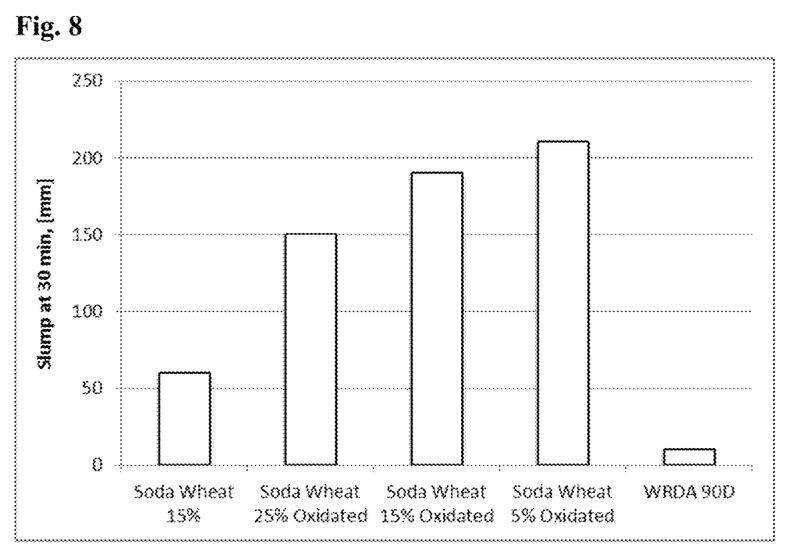
FIG. 8 illustrates the slump test results of lignin plasticized concrete at 30 minutes after mixing, the samples containing either the plasticizer of the invention (Soda wheat 5% oxidized, Soda wheat 15% oxidized and Soda wheat 25% oxidized), unmodified lignin (Soda wheat 15%) or WRDA 90D.

Slump was determined just after preparing the concrete (Slump at 0 min) and after 30 minutes of delay (Slump at 30 min). Also, concrete hardening i.e. the cement hydration reaction was followed by calorimetric measurements. The slump measured just after preparing vs. time to maximum heat flow during hardening is shown in FIG. 7. The slump at 30 minutes is shown in FIG. 8.

The slump in oxidized lignin plasticized concrete at 0 min was fairly comparable to that of WRDA 90D with 2-fold dosing, and clearly higher than in the case of unmodified lignin (Slump at 0 min). After 30 minutes the slump in oxidized lignin plasticized concrete was clearly higher than when using unmodified lignin or WRDA 90D.

Example 5—Modifications of Alkaline O$_2$ Oxidation

Oxidation of commercial soda wheat straw lignin (Protobind 1000) was further developed to improve the cement/concrete plasticizing performance of oxidized lignins by increasing the charge and modifying the molecular weight.

Here, a 2-stage oxidation (two sequential oxidations), a constant pH oxidation, and a combination of the aforementioned were used. The aim in the 2-stage oxidation was to first induce lignin condensation i.e. increase the molecular weight during the initial oxidation stage (1 ox) and thereafter during the following (second) oxidation stage (2 ox) to increase the charge. Both stages of the 2-stage oxidation were conducted using the 1 L Parr reactor (as described in Example 1). The initial pH at the beginning of both oxidation stages was set to 13 i.e. after the first stage oxidation the oxidized lignin solution (lignin d.s. 25 w-%) was diluted to 15 w-% in terms of lignin using a mixture of 5M NaOH and water. The operating conditions are shown in Table 2. The oxidized lignin solution obtained from the second stage oxidation (Soda wheat 15% 2 ox) was used for cement/concrete plasticizing.

The constant pH oxidations of the lignin matter at pH 11.5 and 13 were conducted using a reaction calorimetry reactor equipped with a pH control loop and a pump to introduce 5 M NaOH solution to the reaction solution under excess O$_2$. The lignin content of the solution at the starting point was set to 15 w-%. The lignin content of the solution decreased during the oxidation due to the addition of the 5 M NaOH solution, which neutralized the acidity generated in the reactions. The last modification of the alkaline O$_2$ oxidations included an initial oxidation at lignin content of 25 w-% followed by a constant pH oxidation at pH 13. Table 3 presents the characteristics of the oxidized lignins.

TABLE 2

Operating conditions for the modified alkaline O$_2$ oxidations of soda wheat straw lignin. Oxidation time for all treatments, 30 min.

| Sample name | Plasticizer dry solids in solution, w-% | NaOH/ lignin, w-% | Initial O$_2$/ lignin, w-% | Consumed O$_2$/lignin, w-% | T (initial), °C. |
|---|---|---|---|---|---|
| Soda wheat 25% 1ox | 25 | 24 | 15 | 9 | 40 |
| Soda wheat 15% 2ox* | 15 | 17 | 34 | 8 | 75 |
| Soda wheat c. pH ox* pH 11.5 | 15 → 11.4 | 65 | 46 | 25 | 70 |
| Soda wheat 25% 1ox | 25 | 24 | 15 | 9 | 40 |
| Soda wheat 2ox c. pH* pH 13 | 15 → 10.5 | 75 | 44 | 18 | 70 |

*further tested as plasticizers for mortar and concrete

TABLE 3

Characteristics of the oxidized lignins.

| Sample name | Mn | Mw | PD | Amount of negative charged groups at pH 6, mmol/g |
|---|---|---|---|---|
| Soda wheat 25% 1ox | 2600 | 7320 | 2.8 | 3.4 |
| Soda wheat 15% 2ox* | 2390 | 6265 | 2.6 | 5.3 |
| Soda wheat c. pH ox* pH 11.5 | 1980 | 4545 | 2.3 | n.d. |

Example 6—Determination of the Hydrophilicity of the Oxidized Lignins

A simple procedure was used to evaluate the water solubility of the oxidized lignins. In the procedure, lignin recovery (yield, %) from the solution by acidification and centrifugation was quantified as a function of pH range from 2.5 to 7. Acidification was done using 1 M HCl, after which the precipitate was separated by centrifugation at 10 000 g for 30 min and dried overnight at 105° C. The recovery yield was computed on the given initial lignin content in solution.

Figure 9:
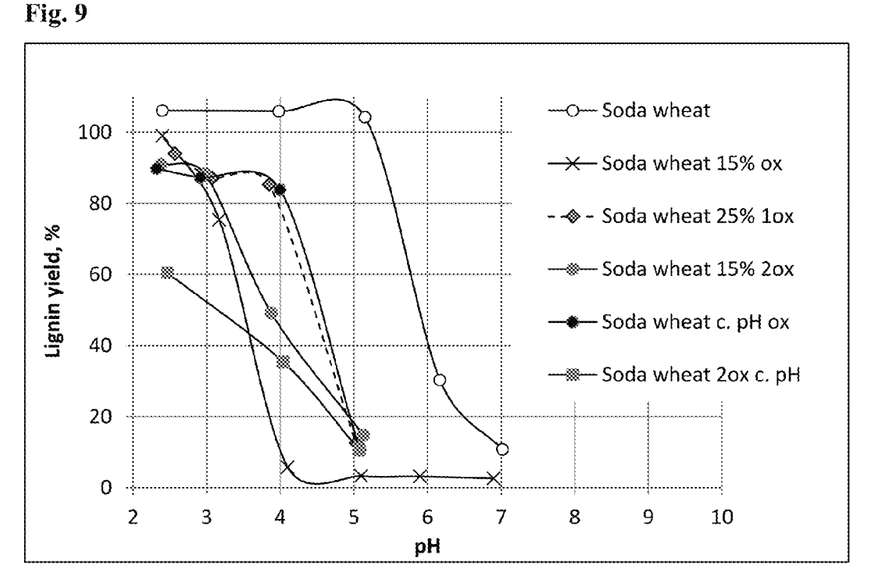
FIG. 9 illustrates the solubility characteristics of the plasticizer of the invention (Soda wheat 15% ox, Soda wheat 25% 1 ox Soda wheat 15% 2 ox, Soda wheat constant pH ox, Soda wheat 2 ox constant pH), and unmodified lignin (Soda wheat).

FIG. 9 illustrates the recovery yield of the oxidized lignins as a function of pH. It is clear, that the alkaline oxidation increases lignin hydrophilicity i.e. solubility, which is particularly advantageous for dispersing and plasticizing applications. Oxidized lignins are more soluble even though their molecular weight has increased when compared to the unmodified lignin. Unmodified soda wheat straw lignin is only soluble above pH 7, while oxidized lignin is already soluble above pH 4 or above pH 5. The results indicate that oxidized lignins are also suitable for dispersing applications in the acidic pH range.

Example 7—Evaluating the Performance of Oxidized Lignins in Mortar and Concrete

Plasticizing performance of the oxidized lignin solutions (produced according to examples 1, 2 and 5) was evaluated using mortar and concrete as a test medium. Mortar was prepared using CEM II, a standard sand mixture, and water with the following recipe: Sand 48.6, CEM II 36 and water 15.4 w-%. Concrete was prepared according to EN1766 type C(0,40), with the exception that CEMII B-M (S-LL) 42,5N was used as the cement. 0.4 w-%, plasticizer dosage (as plasticizer dry solids bases) on cement, was used in preparing both, mortar and concrete. The fluidity of the mortar was studied with Haegermann flow table. Slump test was applied to evaluate the workability of the concrete.

In addition to the plasticizing performance, the effect of the oxidized lignins on cement hydration was followed and several other properties of fresh and matured concrete were tested. Cement hydration kinetics were followed by measuring the heat flow of the plasticized cement paste by calorimetry. A pressure type air content meter was used to determine the air content of mortar and concrete in the fresh state. Density and compression strength of the cured concrete was measured after 28 days. A commercial lignosulfonate (WRDA 90D) and a petroleum-based, polycarboxylate-type superplasticizers (VB Parmix and Glenium 51) were used as reference products. Also, the unmodified soda wheat lignin (dissolved in 1 M NaOH at 15 w-% dry solids) was tested. The results are shown in FIGS. 10-11 and in Table 4 in the case of concrete testing.

Figure 10:
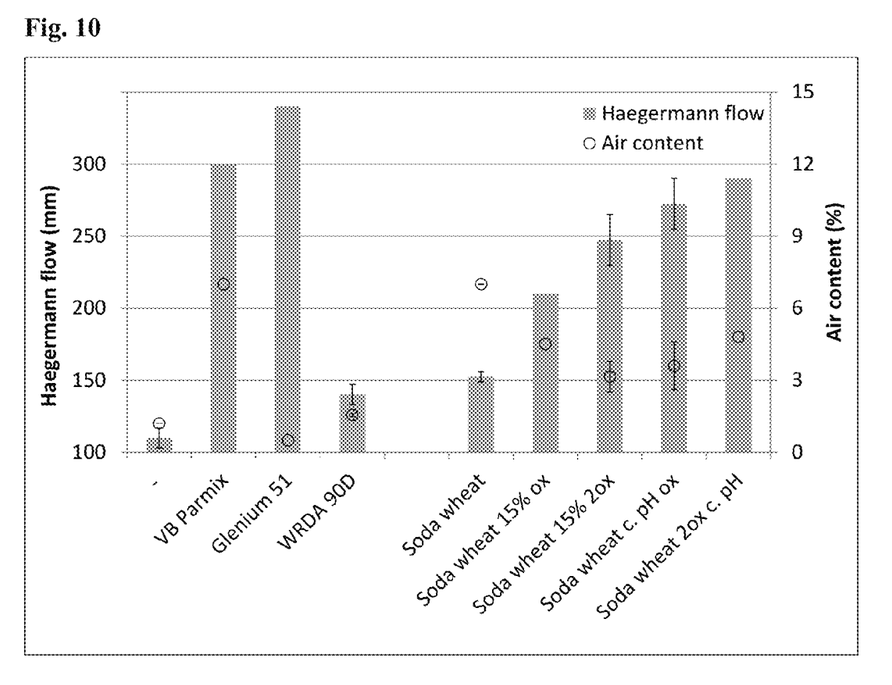
FIG. 10 illustrates the flow properties (Haegermann flow) and air content in fresh state mortar plasticized using the plasticizer of the invention (Soda wheat 15% ox, Soda wheat 15% 2 ox, Soda wheat constant pH ox, Soda wheat 2 ox constant pH), unmodified lignin (Soda wheat), VB Parmix, Glenium 51 or WRDA 90D. Plasticizer dosage 0.4% on cement was used. One reference sample was prepared without plasticizer (−).
Figure 11:
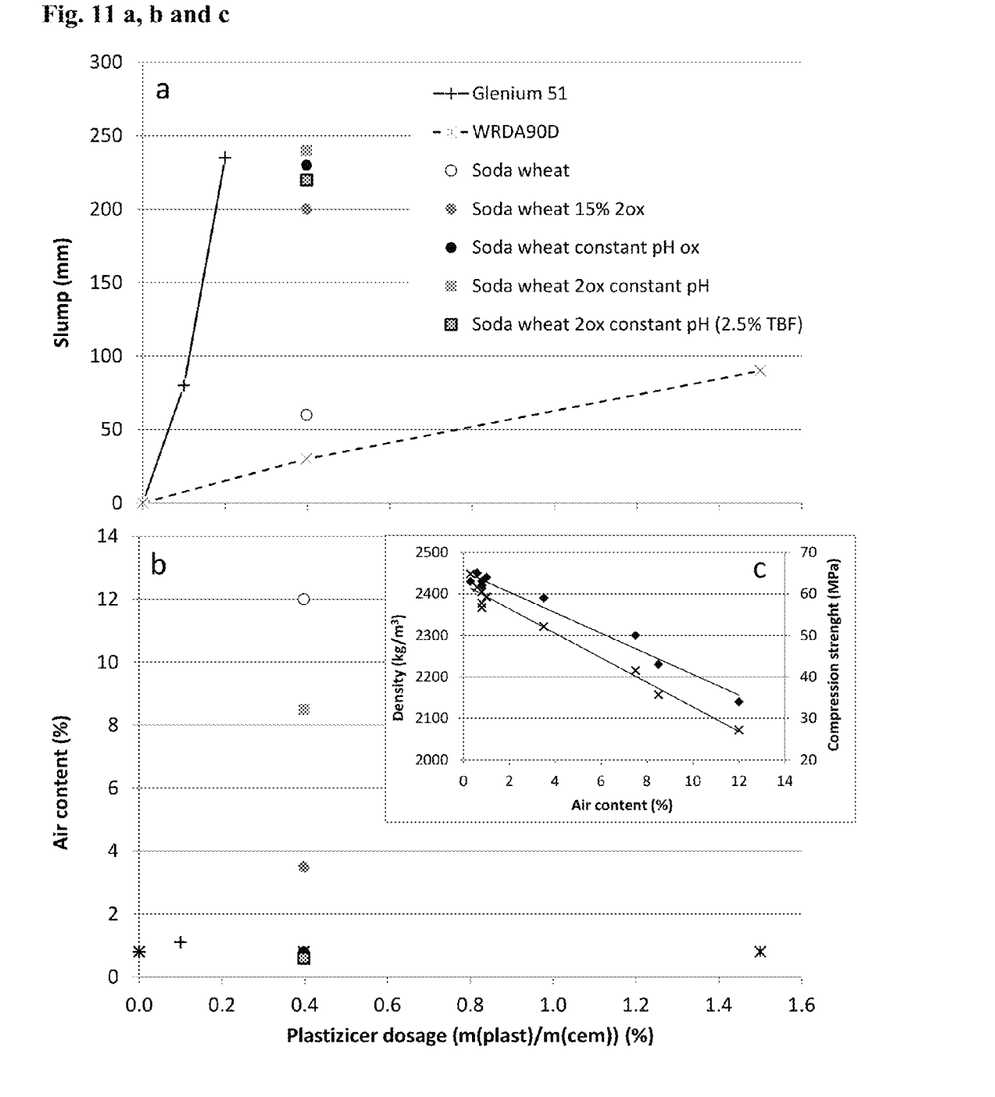

FIG. 10 presents the Haegermann flow value and air content of fresh mortar. It is evident that the production of oxidized lignin by the 2-stage (Soda wheat 15% 2 ox) or constant pH oxidation (Soda wheat c. pH ox) or the combination thereof (Soda wheat 2 ox c. pH) offers even better plasticizing effect in mortar and concrete when compared to oxidized lignin produced by a single-stage oxidation (Soda wheat 15% oxidized i.e. Soda wheat 15% ox) (FIG. 10). All of the aforementioned oxidized lignin i.e. the plasticizers of the invention are superior to lignosulphone product (WRDA 90D).

Oxidized lignin sample, Soda wheat 15% oxidized was previously tested to be superior to a commercial lignosulphonate (WRDA 90D) in concrete plasticizing with a dosage of 0.63 w-% (2.69 kg/m³) (Example 4, FIGS. 7 and 8). FIG. 11A presents that the oxidized lignins produced according to Example 5 provide excellent plasticizing effect in concrete even with dosage of 0.4 w-% on cement. Their impact is again clearly better than that of commercial lignosulphonate (WRDA 90D). The 0.4 w-% dosage of the oxidized lignins, the plasticizers of the invention provide roughly the same plasticizing efficiency as 0.2 w-% dosage of the commercial polycarboxylate-type superplasticizer Glenium 51, which can be considered to stand for an excellent performance. The results of the mortar tests indicate that the performance of oxidized lignins is very close to that of the other polycarboxylate-type superplasticizer (VB Parmix) with equal dosing, 0.4 w-% on cement (FIG. 10).

The modified lignins were measured to introduce air in mortar (FIG. 10). However, the amount was clearly less than in the case of one of the commercial plasticizer products (VB Parmix) and the unmodified lignin. When evaluating the oxidized lignins using concrete as a test medium, one of the samples, Soda wheat constant pH ox showed surprisingly good performance by introducing less air in the mixture than the commercial plasticizer products (FIG. 11B). The air content in fresh concrete correlates with the density and strength properties of the matured concrete (FIG. 11C), and thus in the case of the Soda wheat constant pH ox the compression strength (28 d) was in line with that of concrete plasticized using commercial products. By using a small amount of a defoamer agent (tributylfosfate, TBF, dosage of 2.5 w-% of lignin dry matter) with the other samples, the air content in concrete can be reduced ensuring sufficient properties in the matured concrete (Table 4). Inclusion of defoamer is the common practice with lignosulphonate products which without the agent may cause air entrainment in concrete.

Hydration kinetics was affected with the oxidized lignins to some extent (Table 4), but there is no correlation between the hindered hydration and the compression strength of matured concrete (28 d), which is very essential. Also, lignosulphonates are known to cause some retardation of concrete setting, particularly when their sugar content is high. Only air content that can be controlled has inverse correlation with the compression strength.

TABLE 4

Test results of concrete plasticized with the plasticizers of the invention (Soda wheat 15% 2ox, Soda wheat constant pH ox, Soda wheat 2ox constant pH - without or with the defoamer agent TBF), unmodified lignin (Soda wheat), Glenium 51 or WRDA 90D. One reference sample was prepared without plasticizer (—). c. refers to constant.

| Sample name | Plasticizer Dose | Slump, mm | Spread, mm | Air content | Heat flow, J/g (cement) 24 h | 72 h | 168 h | Density, kg/m3 | Compression strenght (28 d), Mpa |
|---|---|---|---|---|---|---|---|---|---|
| — | 0.00% | 0 | 200 | 0.8% | 196 | 275 | 305 | 2420 | 56.7 |
| Soda wheat | 0.40% | 60 | 200 | 12.0% | 53 | 108 | 119 | 2140 | 27.2 |
| Soda wheat 15% 2ox | 0.40% | 200 | 295 | 3.5% | 22 | 106 | 123 | 2390 | 52.1 |
| Soda wheat c. pH ox | 0.40% | 230 | 370 | 0.8% | 65 | 215 | 279 | 2420 | 57.8 |
| Soda wheat 2ox c. pH | 0.40% | 240 | 450 | 8.5% | 53 | 207 | 263 | 2230 | 35.7 |
| Soda wheat 2ox c. pH (2.5% TBF) | 0.40% | 220 | 330 | 0.6% | 39 | 187 | 247 | 2450 | 61.6 |
| WRDA90D | 0.40% | 30 | 200 | 0.8% | 45 | 76 | 86 | | |
| WRDA90D | 1.50% | 90 | 200 | 0.8% | | | | 2430 | 60.5 |
| WRDA90D | 3.00% | 55 | 200 | 0.9% | | | | | |
| Glenium 51 | 0.20% | 235 | 420 | 0.3% | 162 | 258 | 283 | 2430 | 64.8 |
| Glenium 51 | 0.10% | 80 | 200 | 1.1% | | | | | |

The invention claimed is:

1. A concrete mixture containing aggregate, cement, water and a plasticizer formed of oxidized lignin, said oxidized lignin having been manufactured in a process where a lignin starting material forming an aqueous lignin solution having a lignin content of 0.5-30 wt % was reacted with an oxidizing agent selected from the group of oxygen ($O_2$) and air in solution, said reaction having been carried out in alkaline conditions, at a pH within the range 8-14, using a load of oxidizing agent of 10-95 wt % calculated based on the weight of the lignin, whereby the alkaline conditions are obtained by the addition of an alkaline agent to the solution prior to addition of addition of the oxidizing agent.

2. The concrete mixture according to claim 1, wherein its plasticizer content (as lignin dry solids bases) is ≤0.63 wt % of the cement dry solids.

3. The concrete mixture according to claim 1, wherein its plasticizer content (as lignin dry solids bases) is ≤2.7 kg/m$^3$ of the concrete mixture.

4. The concrete mixture according to claim 1, wherein the cement has 200-500 kg/m$^3$ content with water/cement-ratio 0.30-0.75.

5. A process for manufacturing a concrete mixture, comprising mixing aggregate, cement, water and a plasticizer formed of oxidized lignin, said oxidized lignin having been manufactured in a process where a lignin starting material forming an aqueous lignin solution having a lignin content of 0.5-30 wt % was reacted with an oxidizing agent selected from the group of oxygen ($O_2$) and air in solution, said reaction having been carried out in alkaline conditions, at a pH within the range 8-14, using a load of oxidizing agent of 10-95 wt % calculated based on the weight of the lignin.

6. The process of claim 5, further comprising adjusting the initial temperature to ≤100° C. for the oxidation reaction.

7. The process of claim 5, further comprising adjusting the pH of the lignin solution to a value of 10-14 prior to addition of the oxidizing agent.

8. The process of claim 7, further comprising adjusting the pH of the lignin solution using an alkaline agent or using a buffer.

9. The process of claim 5, further comprising maintaining a constant pH in the lignin solution during the oxidation reaction.

10. The process of claim 5, further comprising allowing the oxidizing agent to react with the lignin for 3-120 minutes.

11. The process of claim 5, further comprising inducing lignin condensation during a first oxidation and increasing negative charge of the lignin during an at least second oxidation.

12. The process of claim 5, further comprising maintaining the constant pH using a reactor equipped with a pH control loop and a pump to introduce an alkaline agent to the reaction solution under excess oxidizing agent.

13. The process of claim 5, further comprising forming an aqueous lignin solution having a lignin content of 5-25 wt %.

14. The process of claim 5, further comprising adding an alkaline agent to provide the alkaline conditions, prior to addition of the oxidizing agent.

15. The concrete mixture of claim 1, wherein the alkaline conditions of the reaction are increased by addition of further NaOH during the reaction.

16. The process of claim 12, wherein the reactor is a reaction calorimetry reactor.

* * * * *